(12) United States Patent
Yachida et al.

(10) Patent No.: US 11,102,382 B2
(45) Date of Patent: Aug. 24, 2021

(54) DIRECTION CONTROL DEVICE, DIRECTION CONTROL METHOD AND RECORDING MEDIUM

(71) Applicant: NEC Corporation, Tokyo (JP)

(72) Inventors: Shoji Yachida, Tokyo (JP); Toshihiko Hiroaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/379,977

(22) Filed: Apr. 10, 2019

(65) Prior Publication Data

US 2019/0238727 A1    Aug. 1, 2019

Related U.S. Application Data

(62) Division of application No. 15/532,157, filed as application No. PCT/JP2015/005983 on Dec. 2, 2015, now abandoned.

(30) Foreign Application Priority Data

Dec. 3, 2014 (JP) .................................. 2014-245098

(51) Int. Cl.
*H04N 7/18* (2006.01)
*H04N 5/222* (2006.01)
(Continued)

(52) U.S. Cl.
CPC ............. *H04N 5/222* (2013.01); *G03B 15/04* (2013.01); *G03B 17/02* (2013.01);
(Continued)

(58) Field of Classification Search
CPC .. H04N 5/222; H04N 5/2328; H04N 5/23258; H04N 5/23212; H04N 5/232;
(Continued)

(56) References Cited

U.S. PATENT DOCUMENTS

2008/0094480 A1    4/2008 Swarr et al.
2010/0188514 A1    7/2010 Sato et al.
(Continued)

FOREIGN PATENT DOCUMENTS

JP      H06-003726 A    1/1994
JP      2007-019776 A   1/2007
(Continued)

OTHER PUBLICATIONS

Singaporean Office Action for SG Application No. 10201810925R dated Feb. 27, 2020.
(Continued)

*Primary Examiner* — Richard T Torrente
(74) *Attorney, Agent, or Firm* — Sughrue Mion, PLLC

(57) ABSTRACT

A direction control device includes: a camera unit that acquires an image captured by photographing a subject by a camera targeted for adjustment of a photographing direction; an image-processing unit that calculates a position of a first setting image that represents the subject in the captured image; a posture detection unit that detects a difference between a position of a second setting image that represents the subject in a reference image registered in advance and the position of the first setting image; and a camera control unit that shifts the photographing direction of the camera based on the difference.

7 Claims, 16 Drawing Sheets

(51) Int. Cl.
*G06K 9/32* (2006.01)
*H04N 5/232* (2006.01)
*G06T 7/70* (2017.01)
*G03B 15/04* (2021.01)
*G03B 17/02* (2021.01)
*G06K 9/00* (2006.01)
*G06T 1/00* (2006.01)
*G06T 7/246* (2017.01)

(52) U.S. Cl.
CPC ....... *G06K 9/00228* (2013.01); *G06K 9/3216* (2013.01); *G06T 1/0014* (2013.01); *G06T 7/70* (2017.01); *H04N 5/2328* (2013.01); *H04N 5/23212* (2013.01); *H04N 5/23218* (2018.08); *H04N 5/23258* (2013.01); *G06T 7/248* (2017.01)

(58) Field of Classification Search
CPC .. G06K 9/3216; G06K 9/00228; G03B 15/04; G03B 17/02; G06T 1/0014
See application file for complete search history.

(56) References Cited

U.S. PATENT DOCUMENTS

| 2010/0231733 A1* | 9/2010 | Dobashi | G06K 9/3216 348/208.4 |
| 2013/0201345 A1* | 8/2013 | Ling | H04N 7/144 348/169 |
| 2013/0314506 A1 | 11/2013 | Imaizumi et al. | |
| 2014/0320702 A1* | 10/2014 | Tsubusaki | H04N 5/23218 348/240.3 |
| 2016/0055674 A1* | 2/2016 | Mullins | G02B 27/017 345/633 |

FOREIGN PATENT DOCUMENTS

| JP | 2007-253699 A | 10/2007 |
| JP | 2008-034997 A | 2/2008 |
| JP | 2010-176326 A | 8/2010 |
| JP | 2011-118724 A | 6/2011 |
| JP | 2013-139067 A | 7/2013 |
| JP | 2013-232722 A | 11/2013 |
| JP | 2014-042287 A | 3/2014 |
| JP | 2014-212473 A | 11/2014 |
| WO | 2008/087974 A1 | 7/2008 |

OTHER PUBLICATIONS

Japanese Office Action for JP Application No. 2016-562304 dated Feb. 18, 2020 with English Translation.
International Search Report for PCT Application No. PCT/JP2015/005983, dated Mar. 1, 2016.
English translation of Written opinion for PCT Application No. PCT/JP2015/005983.
Singapore Office Action for SG Application No. 11201704378Q dated Nov. 9, 2017.
Japanese Office Action for JP Application No. 2016-562304 dated Jun. 16, 2020 with English Translation.

* cited by examiner

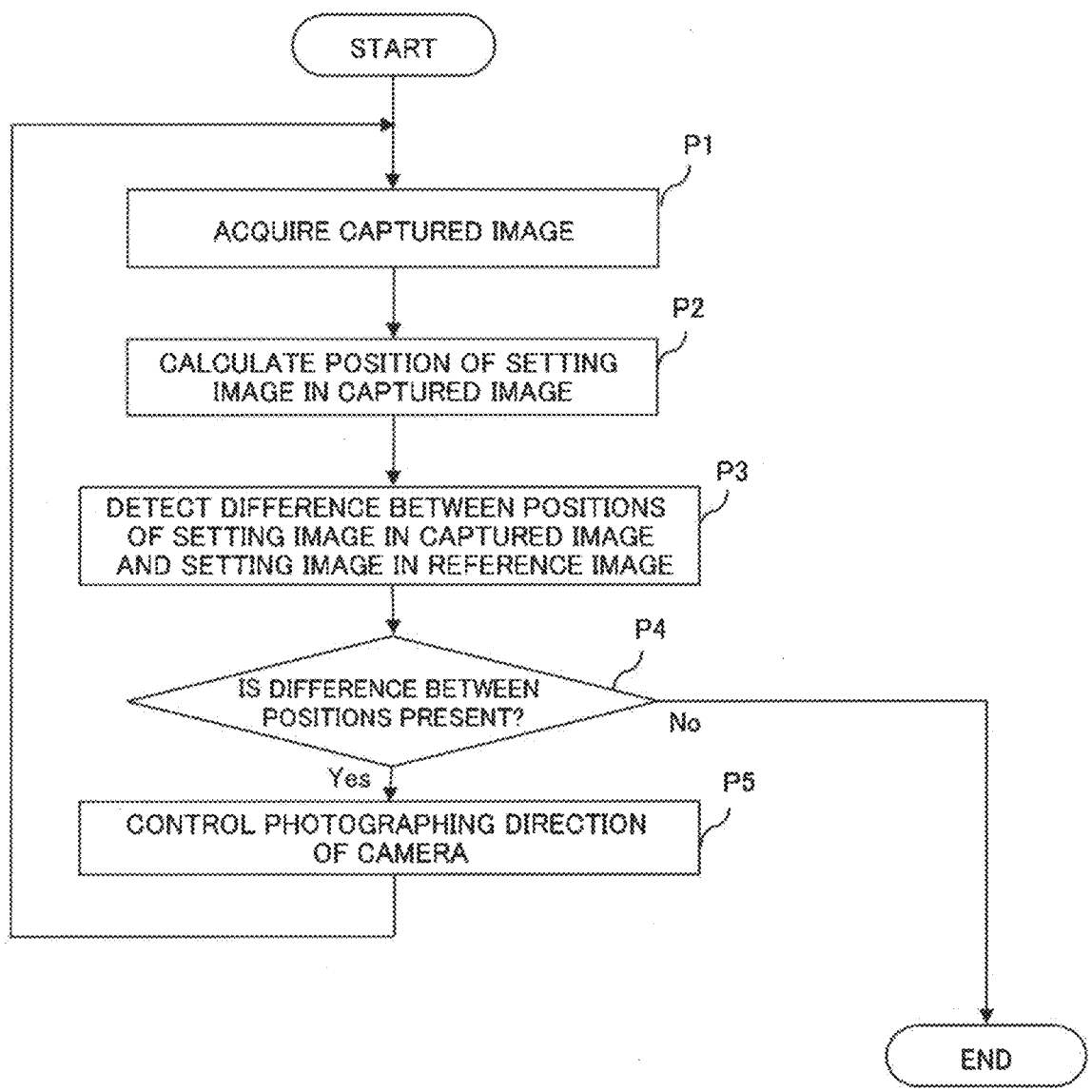

DIRECTION CONTROL DEVICE, DIRECTION CONTROL METHOD AND RECORDING MEDIUM

The present application is a divisional application of Ser. No. 15/532,157 filed on Jun. 1, 2017, which is a National Stage Entry of PCT/JP2015/005983 filed on Dec. 2, 2015, which claims priority from Japanese Patent Application 2014-245098 filed on Dec. 3, 2014, the contents of all of which are incorporated herein by reference, in their entirety.

TECHNICAL FIELD

The disclosed subject matter relates to a direction control device and the like. In particular, the disclosed subject matter relates to the control of the photographing direction of a camera.

BACKGROUND ART

Providing reduction in size and weight of cameras, various wearable cameras capable of photographing situations in hands-free manners have come. The wearable cameras include helmet-mounted wearable cameras, glasses-mounted wearable cameras, and additionally badge-mounted wearable cameras incorporated into recorders which are mounted on the chests of photographers.

With regard to a data-processing device that manages the positions of plural cameras, PTL 1 describes a method for managing the position of each camera by recognizing image data captured by each camera.

PTL 2 describes a method for determining a self-position by using a plane mirror in order to determine the direction of a robot.

CITATION LIST

Patent Literature

[PTL 1] International Publication No. WO 2008/087974
[PTL 2] Japanese Patent Laid-Open No. 2013-139067

SUMMARY OF INVENTION

Technical Problem

With regard to the photographing direction of the camera when mounting the wearable camera, a helmet-mounted or glasses-mounted wearable camera may eliminate adjusting the photographing direction of the camera in case of re-mounting the wearable camera after adjusting the photographing direction of the camera.

In contrast, the photographing direction of a badge-mounted wearable camera which is mounted on the chest, shoulder, or back may be changed from that in previous mounting due to variations in the body shapes of wearers, the deviations of mounting locations, or the like. Therefore, it is necessary to adjust the photographing direction of the camera while confirming an image captured by the camera with a monitor after the camera has been mounted.

Therefore, to provide a technology for capable of setting the photographing direction of a camera to a predetermined direction when a terminal with the camera is mounted on a wearer.

An object of the disclosed subject matter is to provide a technology for solving the problems described above.

Solution to Problem

A direction control device according to one aspect of the disclosed subject matter includes: a camera unit that acquires an image captured by photographing a subject by a camera targeted for adjustment of a photographing direction; an image-processing unit that calculates a position of a first setting image that represents the subject in the captured image; a posture detection unit that detects a difference between a position of a second setting image that represents the subject in a reference image registered in advance and the position of the first setting image; and a camera control unit that shifts the photographing direction of the camera based on the difference.

A direction control method according to one aspect of the disclosed subject matter includes: acquiring an image captured by photographing a subject by a camera targeted for adjustment of a photographing direction; calculating a position of a first setting image that represents the subject in the captured image; detecting a difference between a position of a second setting image that represents the subject in a reference image registered in advance and the position of the first setting image; and shifting the photographing direction of the camera based on the difference.

A recording medium according to one aspect of the disclosed subject matter storing a direction control program that causes a computer to execute: acquiring an image captured by photographing a subject by a camera targeted for adjustment of a photographing direction; calculating a position of a first setting image that represents the subject in the captured image; detecting a difference between a position of a second setting image that represents the subject in a reference image registered in advance and the position of the first setting image; and shifting the photographing direction of the camera based on the difference.

Advantageous Effects of Invention

In the disclosed subject matter, the photographing direction of a camera can be set to a predetermined direction when a terminal with the camera is mounted on a wearer.

BRIEF DESCRIPTION OF DRAWINGS

FIG. 5 is a flowchart illustrating operation of the wearable terminal according to the first example embodiment.

DESCRIPTION OF EMBODIMENTS

Figure 1:
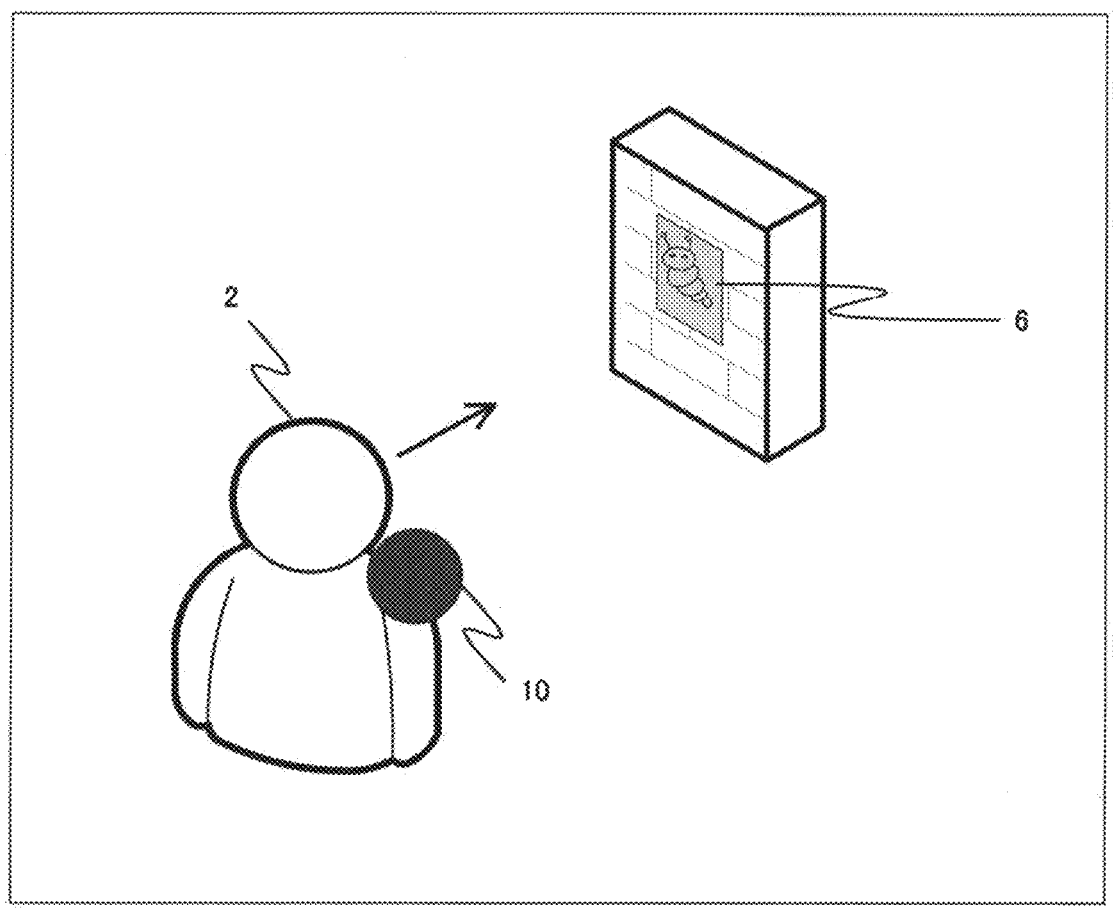
FIG. 1 is a view illustrating an example of adjusting the photographing direction of a camera relating to a wearable terminal according to a first example embodiment.

Example embodiments of a direction control device of the disclosed subject matter will be described in detail with reference to the drawings. In each example embodiment, an example in which the direction control device is applied to a wearable terminal is described below. The directions of arrows illustrated in the block diagrams in the drawings are examples, and the directions of the signals between the blocks are not limited thereto.

First Example Embodiment

Adjustment of the photographing direction of the camera of a wearable terminal will be described with reference to the drawings. FIG. 1 is a view illustrating an example of adjusting the photographing direction of the camera relating to a wearable terminal according to the first example embodiment.

For adjusting the photographing direction, a predetermined subject 6 is first photographed by the camera (not illustrated) of the wearable terminal 10. Then, the camera unit of the wearable terminal 10 acquires an image captured by photographing the subject 6. In the captured image, the image portion of the subject 6 is referred to as a setting image. The setting image is used for setting the photographing direction of the camera to a predetermined direction.

The image-processing unit of the wearable terminal 10 calculates the image position of a first setting image which represents the subject 6 in the acquired captured image. The posture detection unit of the wearable terminal 10 detects the difference between the image position of a second setting image which represents the subject 6 in a reference image registered in advance and the position of the first setting image.

The reference image is an image captured when the photographing direction of the camera of the wearable terminal 10 mounted on a wearer 2 is a predetermined direction.

Conditions for photographing the subject 6 are allowed to be similar between the captured image and the reference image. For example, the position of the subject 6 photographed for acquiring the captured image and the reference image, the focal length of the lens of the camera, or the like is allowed to be the same.

In the control of the camera of the wearable terminal 10, the photographing direction of the camera is controlled based on the detected difference.

Figure 2:
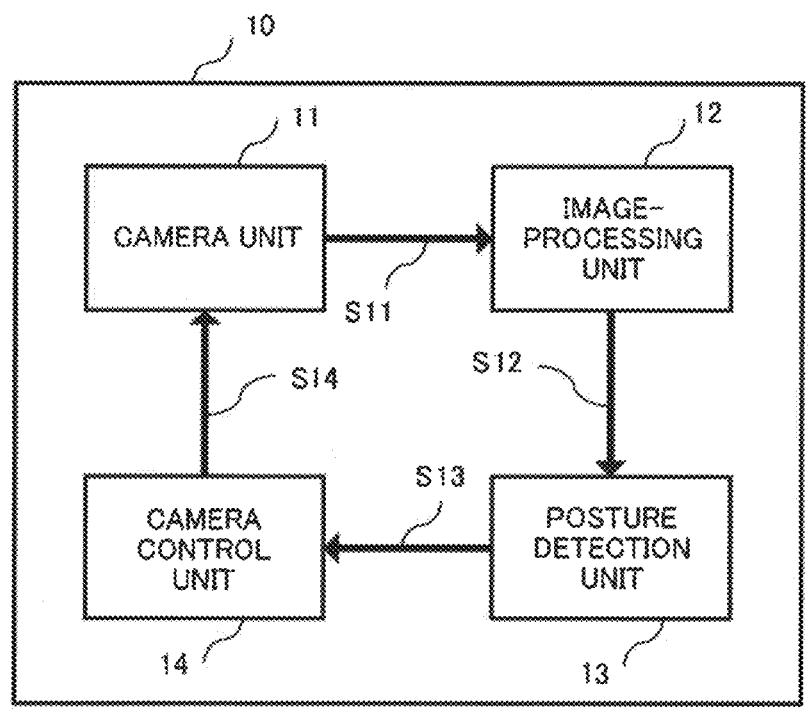
FIG. 2 is a block diagram illustrating a configuration of the wearable terminal according to the first example embodiment.

The configuration of the wearable terminal 10 will be described in detail below with reference to the drawings. FIG. 2 is a block diagram illustrating the configuration of the wearable terminal 10 according to the first example embodiment. As illustrated in FIG. 2, the wearable terminal 10 includes a camera unit 11, an image-processing unit 12, a posture detection unit 13, and a camera control unit 14.

The camera unit 11 of the wearable terminal 10 acquires an image captured by photographing the predetermined subject 6 by the camera (not illustrated). Then, the camera unit 11 notifies the image-processing unit 12 of the captured image S11. Unless otherwise noted, a wearable terminal includes a camera (not illustrated) in each example embodiment. In addition, the camera unit 11 includes a shift unit (not illustrated) for changing the photographing direction of the camera.

The image-processing unit 12 of the wearable terminal 10 generates verification image information S12 based on the captured image S11 and notifies the posture detection unit 13 of the verification image information S12. Details on the verification image information S12 will be described later.

Figure 3:
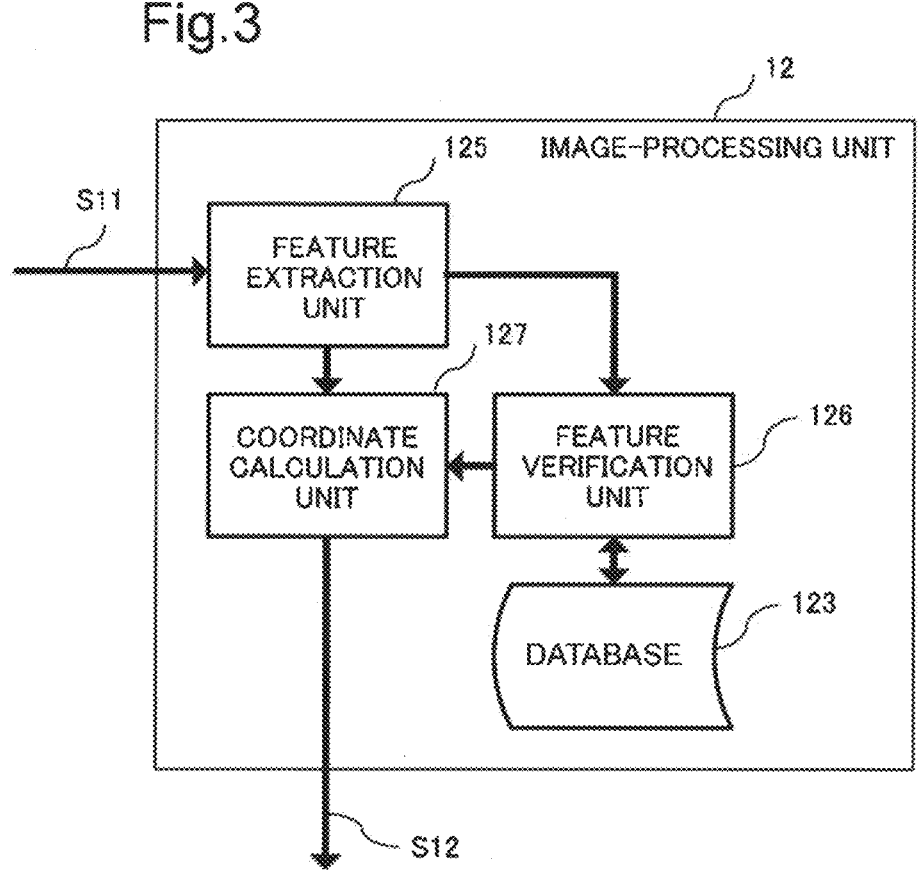
FIG. 3 is a block diagram illustrating a configuration of an image-processing unit of the wearable terminal according to the first example embodiment.

FIG. 3 is a block diagram illustrating the configuration of the image-processing unit 12 of the wearable terminal 10. As illustrated in FIG. 3, the image-processing unit 12 includes a feature extraction unit 125, a feature verification unit 126, a database 123, and a coordinate calculation unit 127.

The feature extraction unit 125 of the image-processing unit 12 extracts the feature amount of a setting image 3A based on the input captured image S11. The feature extraction unit 125 notifies the coordinate calculation unit 127 of the input captured image S11. For example, SIFT (Scale-Invariant Feature Transform) can be used in the extraction of the feature amount. Not only the SIFT described above but also another technique may be used in the extraction of the feature amount.

In the database 123 of the image-processing unit 12, a setting image 3B in the reference image and the feature amount of the setting image 3B are registered in advance. The reference image is an image captured when the photographing direction of the camera of the wearable terminal 10 mounted on a wearer is a predetermined direction. In the database 123, position information that represents the image position of the setting image 3B in the reference image (hereinafter expressed as the position information of the setting image 3B) is also registered in advance. An example of the position information of the setting image 3B is the coordinate information of the setting image 3B in the reference image.

The feature verification unit 126 of the image-processing unit 12 verifies the feature amount of the setting image 3A in the captured image extracted by the feature extraction unit 125 against the feature amount of the setting image 3B registered in the database 123. The feature verification unit 126 notifies the coordinate calculation unit 127 of the position information on the setting image 3B in the reference image registered in the database 123 when the setting image 3A in the captured image and the setting image 3B in the reference image match with each other as a result of the verification.

The coordinate calculation unit 127 of the image-processing unit 12 calculates position information that represents the image position of the setting image 3A in the captured image (hereinafter expressed as the position information of the setting image 3A) based on the captured image S11 notified from the feature extraction unit 125. An example of the position information of the setting image 3A calculated by the coordinate calculation unit 127 is coordinate information.

Further, the coordinate calculation unit 127 notifies the posture detection unit 13 of the position information of the setting image 3A in the captured image and the position information of the setting image 3B in the reference image registered in the database 123, as the verification image information S12.

The posture detection unit 13 generates posture difference information S13 that represents the difference between the position of the setting image 3A in the captured image and the position of the setting image 3B in the reference image, based on the notified verification image information S12, and notifies the camera control unit 14 of the posture difference information S13. Details on the posture difference information S13 will be described later.

Figure 4A:
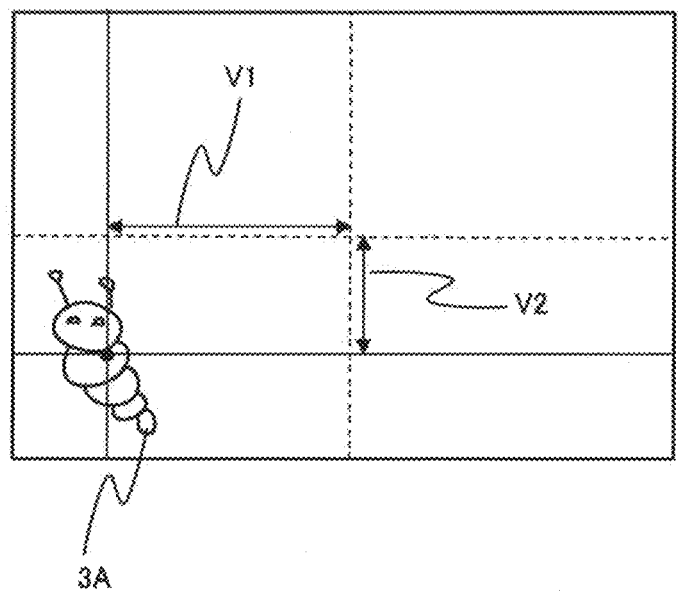
FIG. 4A is a view representing a position of a setting image 3A in a captured image.
Figure 4B:
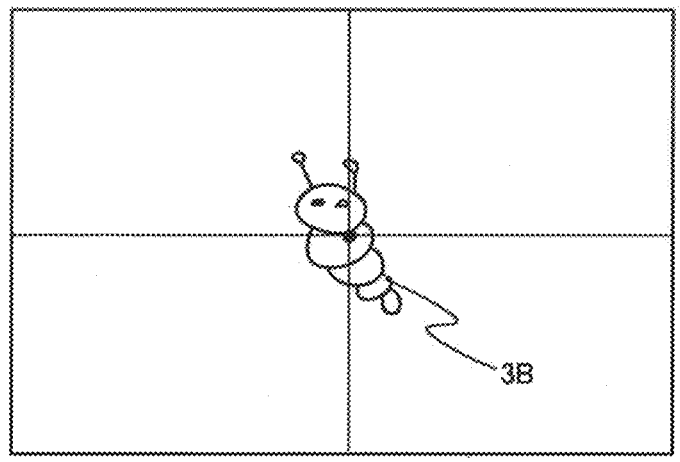
FIG. 4B is a view representing a position of a setting image 3B in a reference image.

FIG. 4A is a view representing the position of the setting image 3A in the captured image, and FIG. 4B is a view representing the position of the setting image 3B in the reference image. Each of the setting image 3A in the captured image and the setting image 3B in the reference image includes an image as a reference point. Such images as reference points are included in the setting images 3A and 3B, for example, by using an object with a predetermined color or shape as a subject. An image in which the color or shape of part of a subject is a reference point is also acceptable.

Each of the position of the reference point of the setting image 3A in the captured image illustrated in FIG. 4A and the position of the reference point of the setting image 3B in the reference image illustrated in FIG. 4B is represented as a point of intersection of a horizontal line (continuous line) and a vertical line (continuous line). In such a case, a point of intersection of a horizontal line (broken line) and a vertical line (broken line) in FIG. 4A indicates the position of the reference point of the setting image 3B.

As illustrated in FIG. 4A, the position of the reference point of the setting image 3A in the captured image shifts horizontally left over a distance V1 and vertically downward over a distance V2 compared with the position of the reference point of the setting image 3B in the reference image.

The posture detection unit 13 generates the posture difference information S13 based on the position information of the reference point of the setting image 3B and the position information of the reference point of the setting image 3A. The posture difference information S13 is, for example, the horizontal shift distance V1 and vertical shift distance V2 of the reference point. The horizontal shift distance V1 and the vertical shift distance V2 can be determined from the coordinate information of the reference point of the setting image 3A and the coordinate information of the reference point of the setting image 3B.

Based on the posture difference information S13, the camera control unit 14 generates shift amount information such that the position of the reference point of the setting image 3A in the captured image approaches the position of the reference point of the setting image 3B in the reference image. Then, the camera control unit 14 notifies the shift unit (not illustrated) of the camera unit 11 of the shift amount information S14 to control the photographing direction of the camera.

The operation of the wearable terminal 10 according to the first example embodiment will now be described with reference to the drawings. FIG. 5 is a flowchart illustrating the operation of the wearable terminal 10 according to the first example embodiment.

First, the camera unit 11 of the wearable terminal 10 acquires an image captured by photographing the predetermined subject 6 by the camera (step P1) and notifies the image-processing unit 12 of the captured image S11. Then, the image-processing unit 12 of the wearable terminal 10 extracts the setting image 3A from the captured image S11, of which the notification has been provided, and calculates the position of the setting image 3A in the captured image (step P2).

Specifically, the feature extraction unit 125 of the image-processing unit 12 extracts the feature amount of the setting image 3A from the captured image, and the feature verification unit 126 verifies the feature amount of the setting image 3B in the reference image registered in the database 123 in advance against the extracted feature amount of the setting image 3A. When the features of the images match with each other, the feature verification unit 126 notifies the coordinate calculation unit 127 of the verification results together with the position information of the setting image 3B in the reference image registered in the database 123 in advance. The coordinate calculation unit 127 calculates the position of the setting image 3A in the captured image and notifies the posture detection unit 13 of the position, together with the position information of the setting image 3B in the reference image, as the verification image information S12.

The posture detection unit 13 detects the difference between the position of the setting image 3A in the captured image and the position of the setting image 3B in the reference image (step P3). When the difference is present (Yes in step P4), the posture detection unit 13 notifies the camera control unit 14 of the difference information between the positions of the setting image 3A and the setting image 3B as the posture difference information S13. Based on the posture difference information S13, the camera control unit 14 generates the shift amount information S14 for a state in which the position of the reference point of the setting image 3A in the captured image approaches the position of the reference point of the setting image 3B in the reference image. For example, when the position of the reference point of the setting image 3A is on the left side of the position of the reference point of the setting image 3B, the camera control unit 14 shifts the azimuth angle of the photographing direction of the camera to the left. The shift amount of the azimuth angle in this case is calculated by, for example, tan $\theta1=V1/V3$, from the horizontal shift distance V1 of the reference point included in the posture difference information S13 and a distance V3 (not illustrated) between the camera and the reference point of the reference image. The distance V3 between the camera and the reference point of the reference image is the distance of a photographing position at the time of capturing the reference image. The distance V3 is acquired together with the position information of the reference image from the database 123.

When the position of the reference point of the setting image 3A is on the downside of the position of the reference point of the setting image 3B, the camera control unit 14 shifts the elevation angle of the photographing direction of the camera downward. The shift amount of the elevation angle in this case is calculated by, for example, tan θ2=V2/V3, from the vertical shift distance V2 of the reference point included in the posture difference information S13 and the distance V3 (not illustrated) between the camera and the reference point of the reference image. The camera control unit 14 notifies the shift unit of the camera unit 11 of the shift amount information S14 to control the photographing direction of the camera (step P5). When the difference is absent (No in step P4), the operation is ended.

Alternative Example of First Example Embodiment

In the first example embodiment, the example in which the feature extraction unit 125 of the image-processing unit 12 notifies the coordinate calculation unit 127 of the captured image S11 is described. However, the first example embodiment is not limited thereto. For example, two of the feature extraction unit 125 and coordinate calculation unit 127 of the image-processing unit 12 may also be notified of the captured image S11 from the camera unit 11. In this case, the need for notifying the coordinate calculation unit 127 of the captured image S11 from the feature extraction unit 125 of the image-processing unit 12 is eliminated.

As above, the wearable terminal 10 of the first example embodiment enables the photographing direction of the camera in the camera unit to be set to a predetermined direction when the wearable terminal 10 is worn.

The reason for this is because the wearable terminal 10 of the first example embodiment photographs the subject 6 by the camera, calculates the differences (horizontal direction: V1, vertical direction: V2) between the position of the setting image 3A in the captured image and the position of the setting image 3B in the reference image, and further shifts the photographing direction of the camera based on the calculated difference information such that the position of the setting image 3A in the captured image approaches the position of the setting image 3B in the reference image.

Second Example Embodiment

Figure 6:
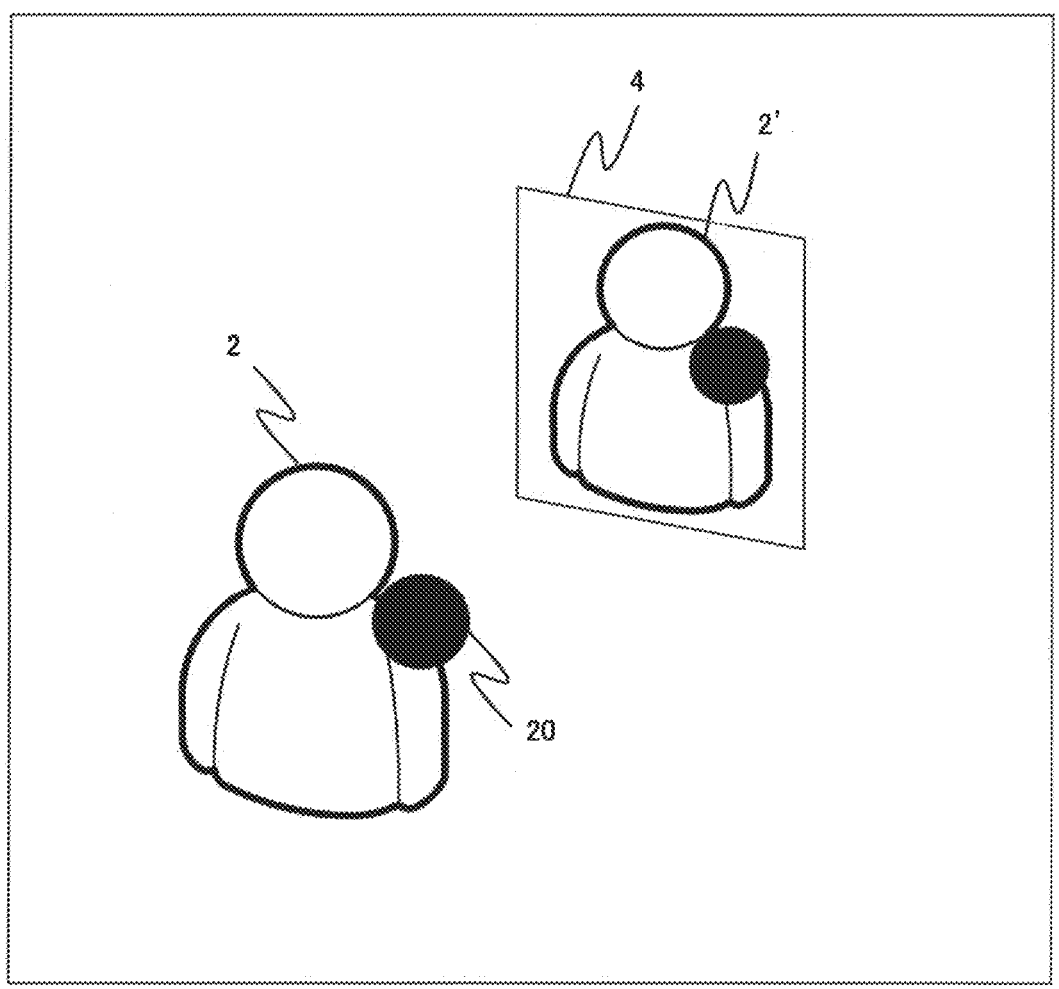
FIG. 6 is a view illustrating an example of adjusting a photographing direction of a camera relating to a wearable terminal according to a second example embodiment.

A second example embodiment will now be described with reference to the drawings. The second example embodiment is an example in which a wearer is used as a subject for adjustment of the photographing direction of a camera. FIG. 6 is a view illustrating an example in which the photographing direction of the camera of a wearable terminal according to the second example embodiment is adjusted. As illustrated in FIG. 6, a wearer 2 stands in front of a mirror 4 and photographs a mirror image 2' of the wearer 2 in the mirror 4, by using a wearable terminal 20 mounted on the wearer 2 in order to allow the wearer 2 with the wearable terminal 20 to be a subject. In the second example embodiment, a face image of the mirror image 2' of the wearer 2 is used as a setting image in a captured image. Conditions for photographing the mirror image 2' are allowed to be similar between the captured image and a reference image. For example, the position of a subject 6 photographed for acquiring the captured image and the reference image, the focal length of the lens of the camera, or the like is allowed to be the same.

Figure 7:
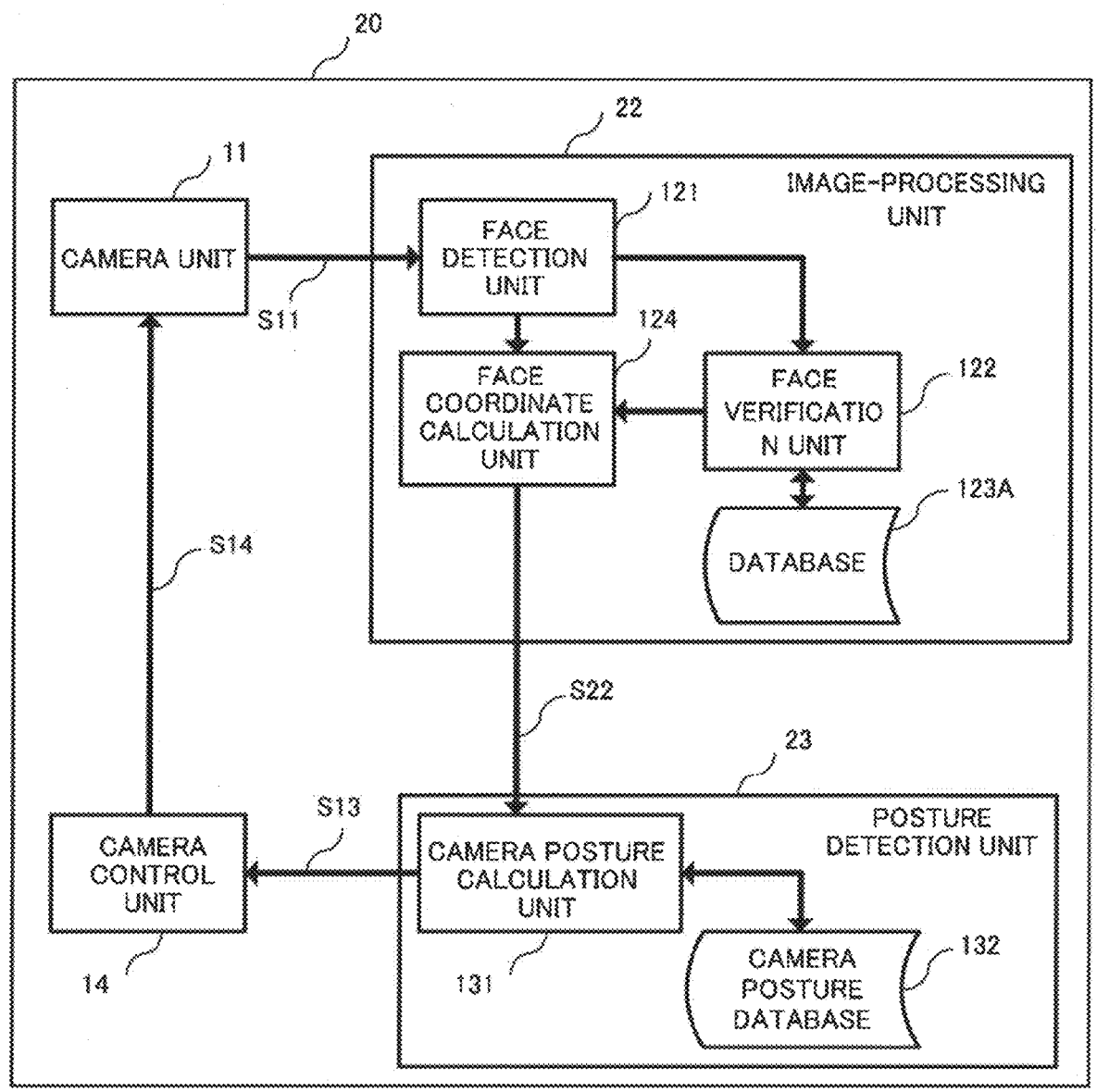
FIG. 7 is a block diagram illustrating a configuration of a wearable terminal according to a second example embodiment.

FIG. 7 is a block diagram illustrating the configuration of the wearable terminal 20 according to the second example embodiment. As illustrated in FIG. 7, the wearable terminal 20 includes a camera unit 11, an image-processing unit 22, a posture detection unit 23, and a camera control unit 14. In the wearable terminal 20 illustrated in FIG. 7, the same configurations as those of the wearable terminal 10 of the first example embodiment are denoted by the same reference characters, and the detailed descriptions thereof are omitted.

First, the mirror image 2' of the wearer 2, reflected by the mirror 4, is photographed by the camera of the wearable terminal 20 targeted for adjustment of the photographing direction thereof. The camera unit 11 of the wearable terminal 20 acquires the captured image and notifies the image-processing unit 22 of the image of the mirror image 2' as the captured image S11.

A face detection unit 121 in the image-processing unit 22 detects the face image of the wearer 2 from the captured image S11. The face detection unit 121 notifies a face verification unit 122 of the detected face image. A known technology for detecting a face area can be applied to the detection of the face image. In addition, the face detection unit 121 notifies a face coordinate calculation unit 124 of the captured image S11.

The face verification unit 122 of the image-processing unit 22 verifies a face image of the wearer 2, registered in a database 123A in advance, against the face image detected by the face detection unit 121. In the verification of the face image, the feature amount of the face image is extracted using SIFT to verify the face image, for example, as described in the first example embodiment. In this case, the extraction of the feature amount of the face image in the captured image is performed in the face detection unit 121 or the face verification unit 122. In addition to the face image of the wearer 2, registered in advance, the feature amount data of the face image is registered in the database 123A in the case of the verification using the feature amount of the face image.

The face image detected by the face detection is reversed horizontally with respect to an actual face image of the wearer 2 because of being an image captured by photographing the mirror image 2', reflected by the mirror 4, by the camera. Therefore, the face image of the wearer 2, registered in the database 123A of the image-processing unit 22, is also regarded as the face image of the mirror image 2' of the wearer 2.

Conditions for photographing the mirror image 2' of the wearer 2 are allowed to be similar between photographing for adjusting the photographing direction of the camera and photographing for registration in the database. For example, the photographing position of the mirror image 2', the focal length of the lens of the camera, or the like is allowed to be the same.

The position information of the face image of the mirror image 2' of the wearer 2 is registered in the database 123A of the image-processing unit 22. The face image of the mirror image 2' of the wearer 2 is a face image in an image (hereinafter expressed as a reference image) captured when the photographing direction of the camera is a predetermined direction. With regard to the position information of the face image in the reference image, for example, a rectangle is formed around the face of the wearer 2 in the face image, and the coordinates of the corners of the rectangular are regarded as the position information of the face image. Figures formed around the face of the wearer 2 in order to specify the position information of the face image may have shapes of a circle or a polygon in addition to the rectangle. In addition, identification information for identifying the wearer 2 and wearer information including the height data of the wearer 2 are registered in the database 123A. The identification information is, for example, an arbitrary character string assigned to each wearer.

When the detected face image and the face image registered in the database 123A match with each other, the face verification unit 122 sends the position information of the face image in the reference image and the wearer information to the face coordinate calculation unit 124.

Then, the face coordinate calculation unit 124 of the image-processing unit 22 calculates the position information of the face image in the captured image of which the notification has been provided from the face detection unit 121. With regard to the position information of the face image in the captured image, a rectangle is formed around the face of the wearer 2, and the coordinates of the corners of the rectangle are regarded as the position information of the face image, like the position information of the face image in the above-described reference image.

Figure 8:
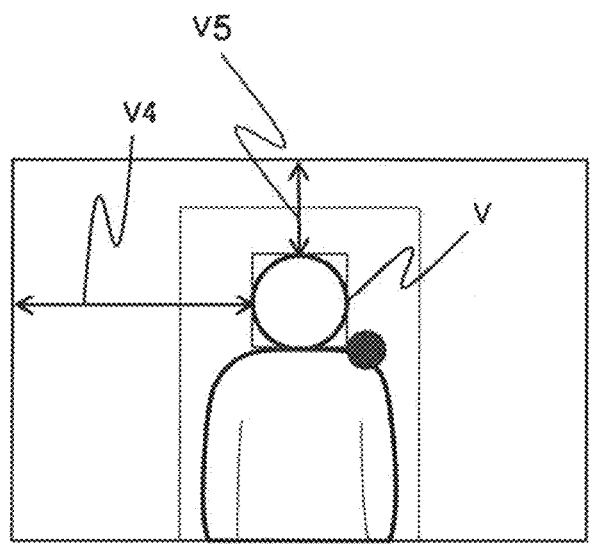
FIG. 8 is a view illustrating a position of a face image in a captured image.

FIG. 8 is a view illustrating the position of the face image in the captured image of the mirror image 2'. As illustrated in FIG. 8, the position of the face image V in the captured image is defined by the distance (horizontal direction: V4, vertical direction: V5) between the left or top edge of the captured image and the rectangular image based on the coordinates of the rectangle formed around the face image. The face coordinate calculation unit 124 sends verification image information S22 including the position information of the face image in the captured image, the position information of the face image in the reference image, and the wearer information to the posture detection unit 23.

The posture detection unit 23 generates posture difference information S13 that represents the difference between the position of the face image in the captured image and the position of the face image in the reference image based on the position information of the face image in the captured image and the position information of the face image in the reference image.

Further, the posture detection unit 23 includes the function of generating correction information that is reflective of camera position information associated with the height of the wearer 2, in addition to the function of generating the posture difference information S13 that represents the difference between the positions of the face images in the captured image and the reference image.

The photographing direction of the camera based on the posture difference information S13 becomes a direction toward the face of the wearer 2, reflected by the mirror 4, when the photographing direction of the camera is adjusted using the face image of the wearer 2, reflected by the mirror 4, like the second example embodiment, as illustrated in FIG. 6. For example, when the height of the wearer 2 is 200 cm, the position of the camera mounted on the wearer 2 is at a height of 180 cm, and therefore, it is difficult to allow a subject closer to the feet to be included in the captured image. In contrast, when the height of the wearer 2 is 140 cm, the position of the camera is at a height of 120 cm, and it is difficult to allow an upper part of the subject to be included in the captured image. Therefore, it is necessary to make a correction for the elevation angle of the photographing direction of the camera, reflective of the height of the wearer 2 on which the wearable terminal 20 is mounted.

A camera posture calculation unit 131 in the posture detection unit 23 calculates correction information on the photographing direction of the camera, reflective of the height of the wearer 2, based on the camera position information registered in a camera posture database 132 in the posture detection unit 23. Then, the camera posture calculation unit 131 adds the correction information to the posture difference information S13 and notifies the camera control unit 14 of thus obtained posture difference information. As the camera position information, camera position information corresponding to the wearer is read from the camera posture database 132 by using the identification information included in the wearer information.

The camera control unit 14 controls the photographing direction of the camera based on: the posture difference information S13 that is calculated in the posture detection unit 23 and that represents the difference between the positions of the face images in the captured image and the reference image; and the correction information based on the camera position information.

Figure 9:
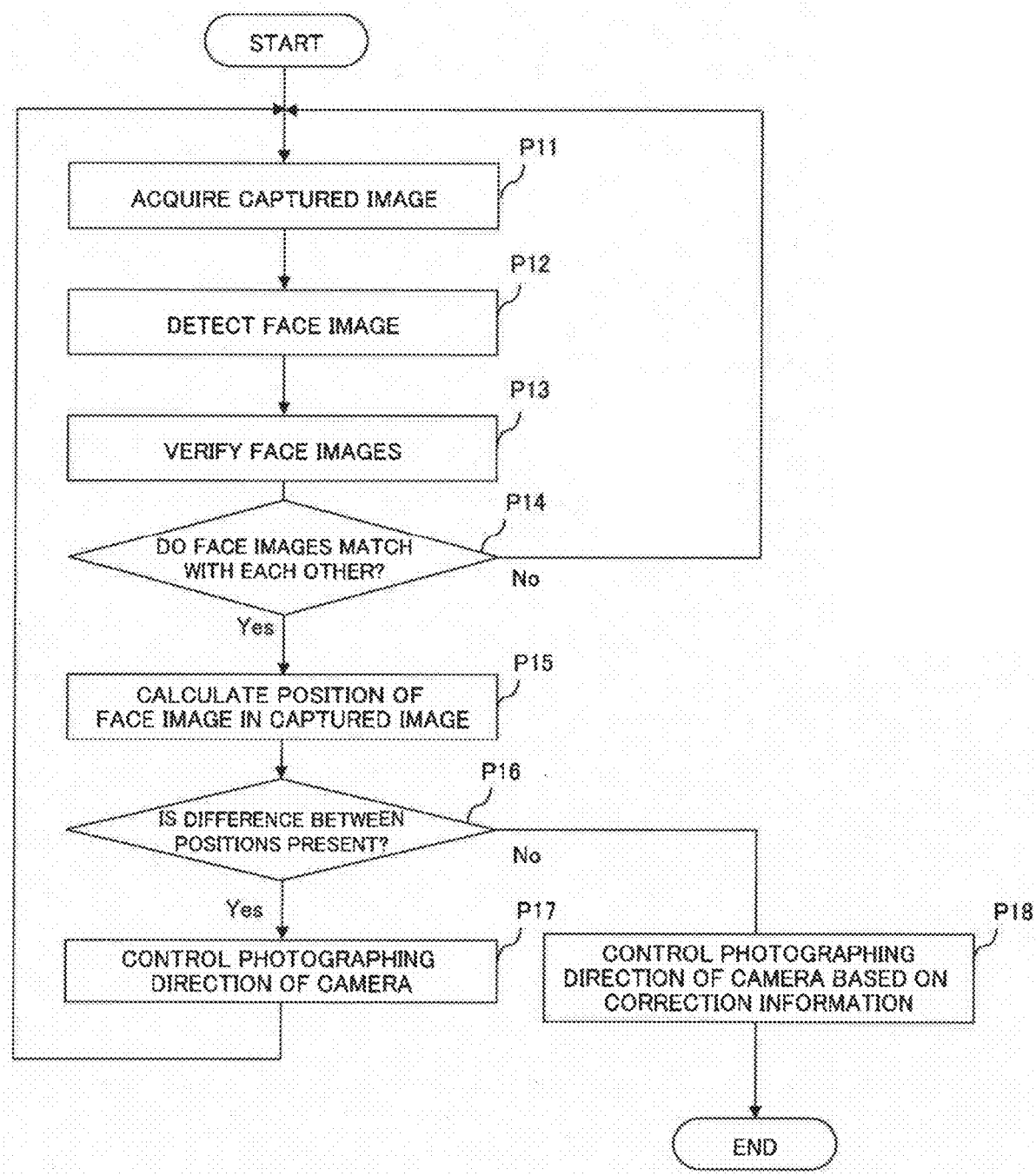
FIG. 9 is a flowchart illustrating operation of the wearable terminal according to the second example embodiment.

The operation of the wearable terminal 20 according to the second example embodiment will now be described with reference to the drawings. FIG. 9 is a flowchart illustrating the operation of the wearable terminal 20 according to the second example embodiment.

First, the camera unit 11 of the wearable terminal 20 acquires the image captured by photographing the mirror image 2' of the wearer 2, reflected by the mirror 4, by the camera (step P11) and notifies the image-processing unit 22 of the captured image S11. Then, the image-processing unit 22 of the wearable terminal 20 detects the face image of the wearer 2 from the captured image S11 of which the notification has been provided (step P12) and calculates the position of the face image in the captured image.

Specifically, the face detection unit 121 of the image-processing unit 22 detects the face image from the captured image (step P12), and the face verification unit 122 verifies the face image stored in the database 123A in advance against the extracted face image (step P13). The process of the face verification unit 122 returns to step P11 when the face images do not match with each other (No in step P14). When the face images match with each other (Yes in step P14), the face verification unit 122 sends the position information of the face image in the reference image and the wearer information, registered in the database 123A, to the face coordinate calculation unit 124.

The face coordinate calculation unit 124 calculates the position of the face image in the captured image (step P15) and sends the wearer information, together with the position information of the face image in the reference image, to the posture detection unit 23.

The posture detection unit 23 confirms whether the difference between the positions of the face image in the captured image and the face image in the reference image is present (step P16). When the difference between the positions is present (Yes in step P16), the posture difference information is sent to the camera control unit 14. Based on the posture difference information, the camera control unit 14 gives an instruction to a shift unit (not illustrated) of the camera unit 11 to control the photographing direction of the camera (step P17).

The wearable terminal 20 repeats step P11 to step P17 until the difference between the positions of the face image in the captured image and the face image in the reference image becomes absent. When the difference between the positions of the face images becomes absent (No in step P16), the photographing direction of the camera is controlled based on the correction information (step P18).

Alternative Example of Second Example Embodiment

In the second example embodiment, the example in which the face detection unit 121 of the image-processing unit 22 notifies the face coordinate calculation unit 124 of the captured image S11 is described.

However, the second example embodiment is not limited thereto. For example, two of the face detection unit 121 and face coordinate calculation unit 124 of the image-processing unit 22 may also be notified of the captured image S11 from the camera unit 11. In this case, the need for notifying the face coordinate calculation unit 124 of the captured image S11 from the face detection unit 121 of the image-processing unit 22 is eliminated.

As above, the wearable terminal 20 of the second example embodiment enables the photographing direction of the camera in the camera unit to be set to a predetermined direction, like the first example embodiment. The reason for this is because the wearable terminal 20 of the second example embodiment photographs the mirror image 2' of the wearer 2 by the camera, calculates the difference (horizontal direction: V4, vertical direction: V5) between the position of the face image in the captured image and the position of the face image in the reference image, and further shifts the photographing direction of the camera based on the calculated difference information such that the position of the face image in the captured image approaches the position of the face image in the reference image.

In addition, the wearable terminal of the second example embodiment enables the photographing direction of the camera to be controlled based on the camera position information associated with the height of the wearer 2. Because the data of the wearer 2 is read from the database 123A when the face images match with each other as a result of the verification of the face images, the protection of personal information is also facilitated.

Third Example Embodiment

A third example embodiment will now be described with reference to the drawings. The third example embodiment is an example in which a two-dimensional bar code is used for a subject for adjustment of the photographing direction of a camera. In the descriptions of the third example embodiment, the same configurations as those of the first example embodiment are denoted by the same reference characters, and the detailed descriptions thereof are omitted.

Figure 10:
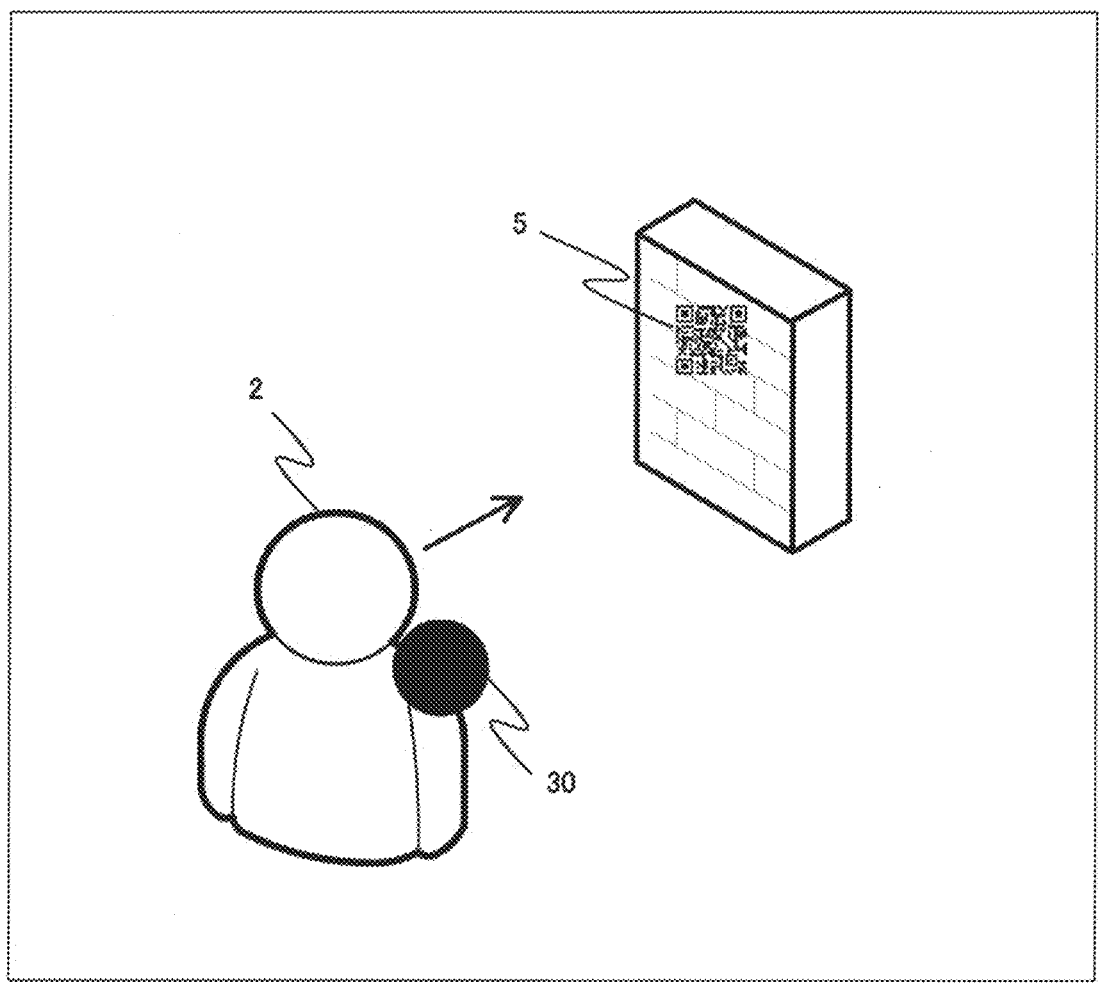
FIG. 10 is a view illustrating an example of adjusting a photographing direction of a camera relating to a wearable terminal according to a third example embodiment.

FIG. 10 is a view illustrating an example in which the photographing direction of the camera of a wearable terminal according to the third example embodiment is adjusted. The camera (not illustrated) of the wearable terminal 30 mounted on a wearer 2 is a camera targeted for adjustment of the photographing direction thereof. The two-dimensional bar code 5 is photographed by the camera of the wearable terminal 30.

Figure 11:
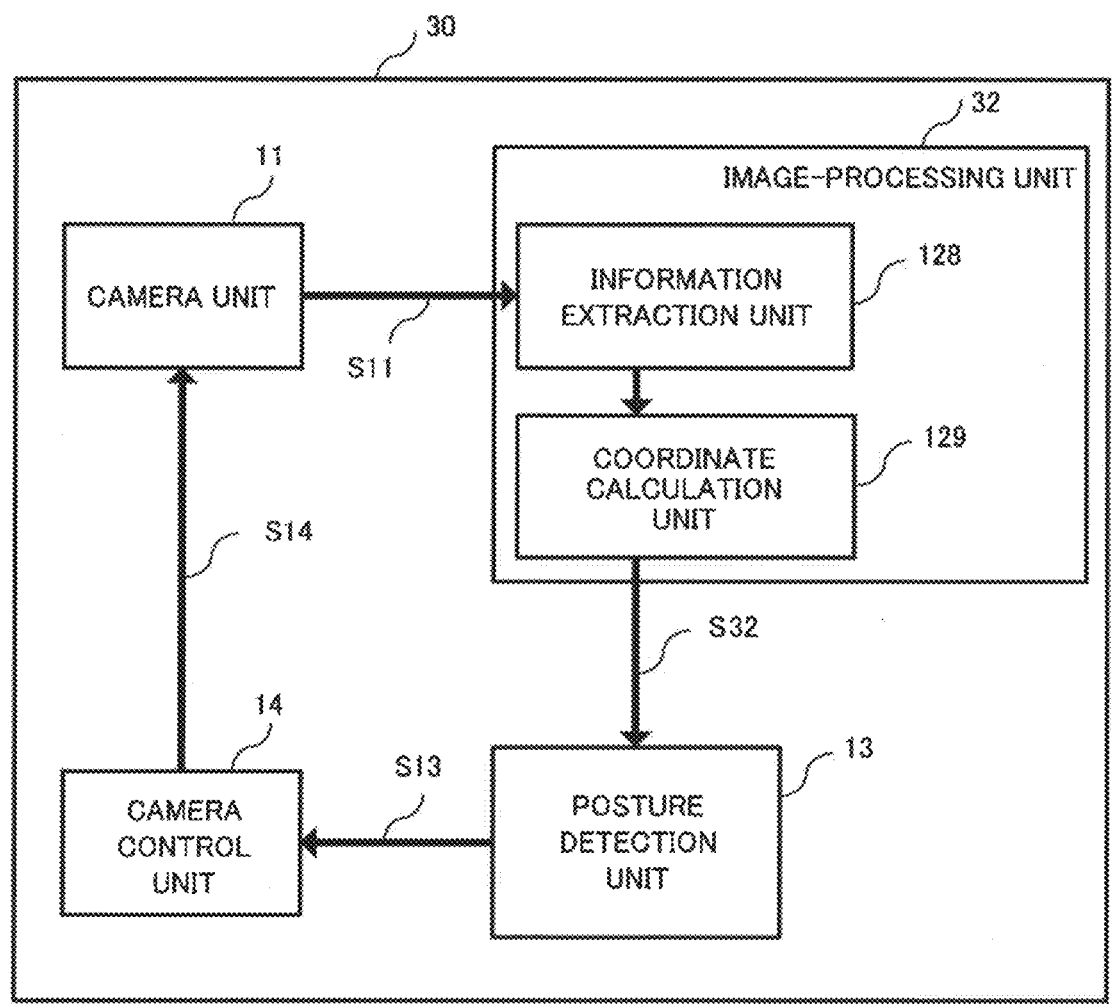
FIG. 11 is a block diagram illustrating a configuration of a wearable terminal according to the third example embodiment.

FIG. 11 is a block diagram illustrating the configuration of the wearable terminal 30 according to the third example embodiment. As illustrated in FIG. 11, the wearable terminal 30 includes a camera unit 11, an image-processing unit 32, a posture detection unit 13, and a camera control unit 14.

The camera unit 11 of the wearable terminal 30 acquires an image captured by photographing the two-dimensional bar code 5 and notifies the image-processing unit 32 of the captured image S11.

The image-processing unit 32 of the wearable terminal 30 generates image information S32 from the input captured image S11 and notifies the posture detection unit 13 of the image information S32. Specifically, the image-processing unit 32 includes information extraction unit 128 and coordinate calculation unit 129. The information extraction unit 128 extracts bar code information from an image of the two-dimensional bar code 5 in the input captured image S11. The bar code information of the two-dimensional bar code 5 includes the information of the size of the two-dimensional bar code 5 and the installation position (height) of the two-dimensional bar code 5.

The coordinate calculation unit 129 calculates the position information of the two-dimensional bar code in the captured image and notifies the posture detection unit 13 of the position information, together with the bar code information, as the image information S32. The position information of the two-dimensional bar code can be defined by the coordinates of the image of the two-dimensional bar code in the captured image and by the respective distances (horizontal direction and vertical direction) between the left and top edges of the captured image and the left and top edges of the image of the two-dimensional bar code.

The posture detection unit 13 of the wearable terminal 30 generates posture difference information S13 from the image position of the two-dimensional bar code in the captured image and the bar code information based on the input image information S32 and notifies the camera control unit 14 of the posture difference information S13.

Based on the posture difference information S13, the camera control unit 14 of the wearable terminal 30 instructs the camera unit 11 such that the position of a setting image 3A in the captured image approaches the position of a setting image 3B in a reference image to control the photographing direction of the camera.

Figure 12:
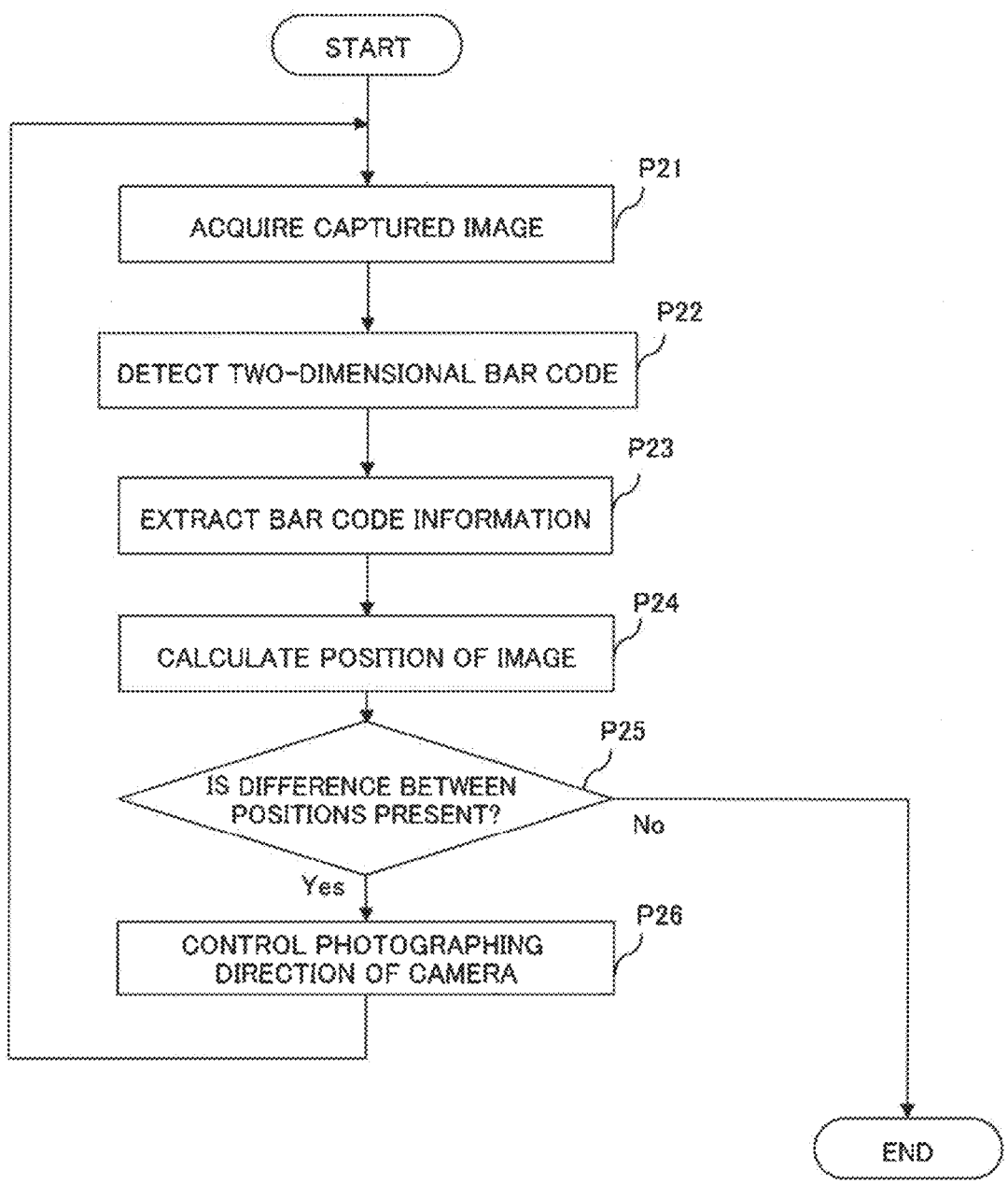
FIG. 12 is a flowchart illustrating operation of the wearable terminal according to the third example embodiment.

The operation of the wearable terminal 30 according to the third example embodiment will now be described with reference to the drawings. FIG. 12 is a flowchart illustrating the operation of the wearable terminal 30 according to the third example embodiment. The same operations of the third example embodiment as those of the first example embodiment are denoted by the same reference characters, and the detailed descriptions thereof are omitted.

The image-processing unit 32 of the wearable terminal 30 acquires the captured image of the two-dimensional bar code (step P21). The information extraction unit 128 detects the two-dimensional bar code 5 from the input captured image S11 (step P22) and extracts the bar code information of the two-dimensional bar code 5 (step P23). The bar code information includes the information of the size of the two-dimensional bar code and the installation height of the two-dimensional bar code.

The coordinate calculation unit 129 calculates the position of the two-dimensional bar code image from the two-dimensional bar code image in the captured image S11 (step P24). The coordinate calculation unit 129 notifies the posture detection unit 13 of the calculated position information of the two-dimensional bar code image.

A camera posture calculation unit 131 in the posture detection unit 13 calculates posture difference information from the position information of the two-dimensional bar code image as well as the size of the two-dimensional bar code and the installation height of the two-dimensional bar code, included in the bar code information.

Based on the posture difference information calculated in the posture detection unit 13, the camera control unit 14 controls a camera shift amount for instructing a shift unit (not illustrated) in the camera unit 11 to eliminate a direction deviation to control the photographing direction of the camera of the camera unit 11 (step P26).

As above, the wearable terminal 30 according to the third example embodiment enables the photographing direction of the camera in the camera unit to be set to a predetermined direction, like the third example embodiment.

In accordance with the wearable terminal 30 according to the third example embodiment, the information of the installation height or size of the two-dimensional bar code can be obtained from the photographed two-dimensional bar code, and therefore, the storage capacity of the database can be reduced.

Fourth Example Embodiment

A fourth example embodiment will now be described with reference to the drawings. In the descriptions of the fourth example embodiment, the same configurations as those of the first example embodiment are denoted by the same reference characters, and the detailed descriptions thereof are omitted.

Figure 13:
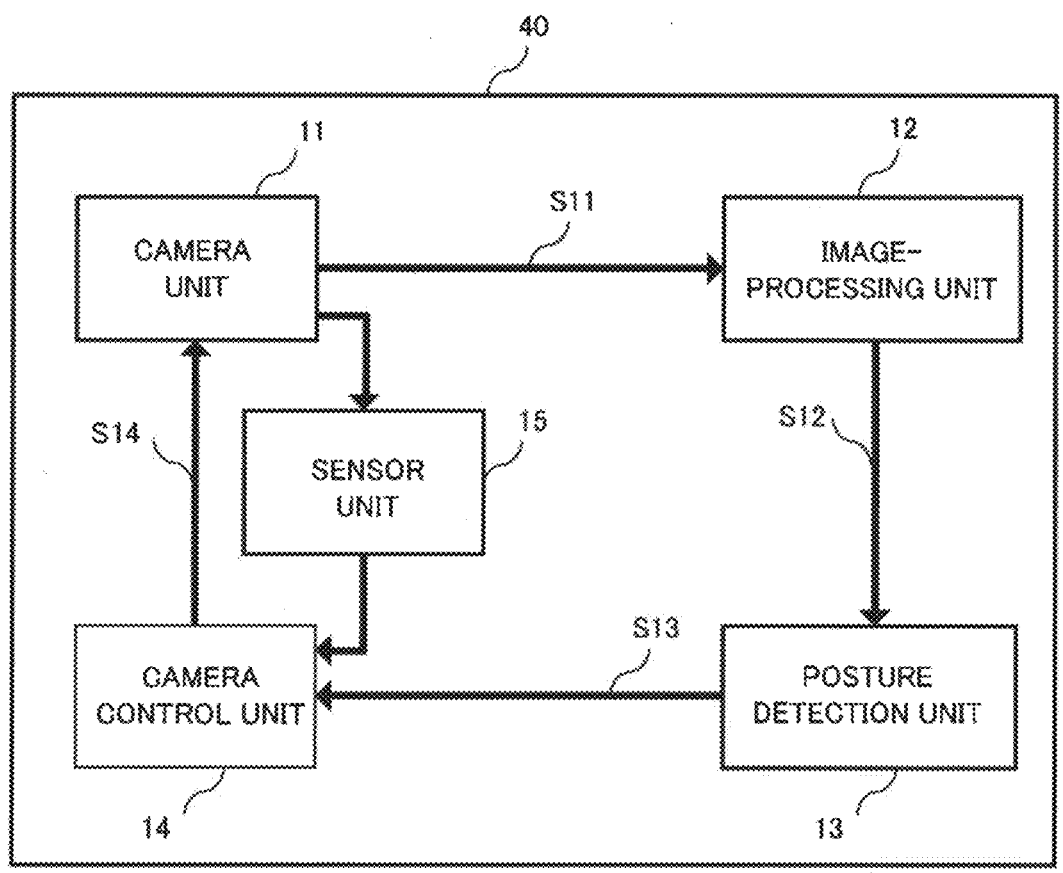
FIG. 13 is a block diagram illustrating a configuration of a wearable terminal according to a fourth example embodiment.

FIG. 13 is a block diagram illustrating the configuration of a wearable terminal 40 according to the fourth example embodiment. As illustrated in FIG. 13, the wearable terminal 40 includes a camera unit 11, an image-processing unit 12, a posture detection unit 13, a camera control unit 14, and a sensor unit 15.

The sensor unit 15 of the wearable terminal 40 is mounted on the camera unit 11 and has the function of storing the photographing direction of a camera after the photographing direction of a camera has been controlled by the camera unit 11. Specifically, the sensor unit 15 includes a triaxial gyro sensor or a 6-axis sensor. In the wearable terminal 40, a direction toward which the gyro sensor is directed can be registered as the adjusted photographing direction of the camera by determining the photographing direction of the camera by the camera control unit 14 and by then activating the gyro function of the sensor unit 15.

For example, when the photographing direction of the camera of the wearable terminal 40 deviates due to the motion of a wearer, the wearable terminal 40 can correct the photographing direction of the camera without re-capturing a predetermined image by using the direction information of the gyro sensor of the sensor unit 15. The sensor unit 15 of the fourth example embodiment can be applied to all of the first example embodiment to the third example embodiment.

Figure 14:
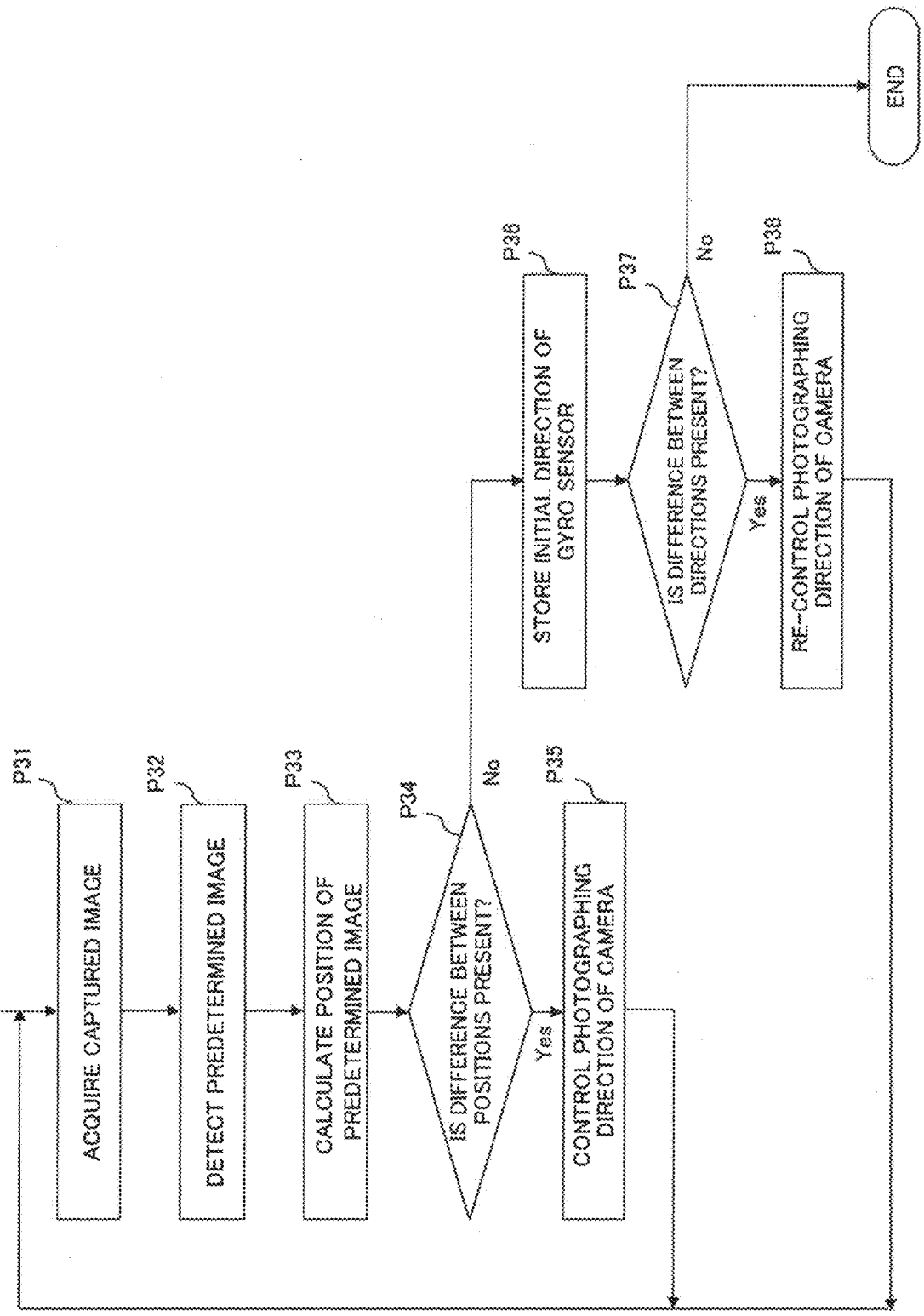
FIG. 14 is a flowchart illustrating operation of the wearable terminal according to the fourth example embodiment.

The operation of the wearable terminal 40 according to the fourth example embodiment will now be described with reference to the drawings. FIG. 14 is a flowchart illustrating the operation of the wearable terminal 40 according to the fourth example embodiment. In the following description, the descriptions of the same operations as those of the first example embodiment are omitted.

The posture detection unit 13 confirms whether a difference is present between the positions of a setting image 3A in a captured image and a setting image 3B in a reference image. When the difference between the positions is present (Yes in step P34), the posture detection unit 13 calculates posture difference information S13 and notifies the camera control unit 14 of the posture difference information S13. Based on the posture difference information calculated in the posture detection unit 13, the camera control unit 14 gives an instruction (shift amount information S14) to the camera unit 11 (step P35) to control the photographing direction of the camera. When the difference between the positions is absent (No in step P34), the gyro function of the sensor unit 15 is activated, and the photographing direction of the camera in a state in which the difference between the positions is absent is stored as the initial direction of the gyro sensor (step P36).

After the adjustment of the photographing direction of the camera by the posture detection unit 13, the sensor unit 15 confirms whether the difference between the photographing direction of the camera and the initial direction of the gyro sensor is present (step P37). When the difference between the directions is present (Yes in step P37), the sensor unit 15 calculates direction difference information (angular difference) between the photographing direction and the initial direction and notifies the camera control unit 14 of the direction difference information. Based on the direction difference information, the camera control unit 14 generates the shift amount information S14 to eliminate the direction difference and gives an instruction to the camera unit 11 to re-control the photographing direction of the camera (step P38).

As above, the wearable terminal 40 according to the fourth example embodiment enables the photographing direction of the camera in the camera unit to be set to a predetermined direction, like the first example embodiment. In addition, the wearable terminal 40 according to the fourth example embodiment enables the photographing direction of the camera to be corrected without re-capturing a predetermined image.

Fifth Example Embodiment

Figure 15A:
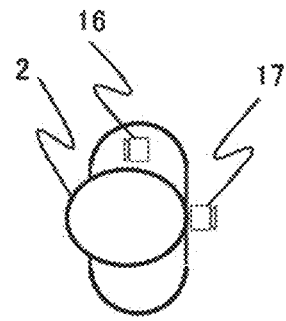
FIG. 15A is a top schematic view illustrating an example of mounting a front camera unit and a back camera unit of a wearable terminal according to a fifth example embodiment.
Figure 15B:
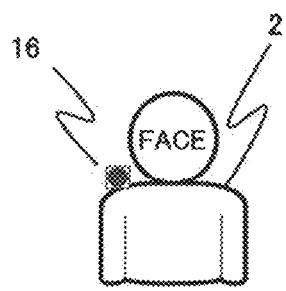
FIG. 15B is a front schematic view illustrating an example of mounting the front camera unit of the wearable terminal according to the fifth example embodiment.
Figure 15C:
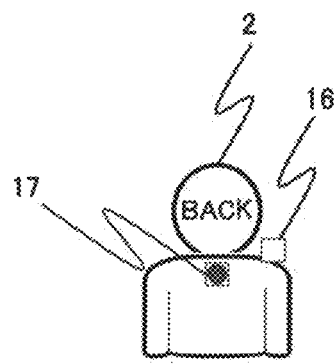
FIG. 15C is a back schematic view illustrating the example of mounting the front camera unit and the back camera unit of the wearable terminal according to the fifth example embodiment.

A fifth example embodiment will now be described with reference to the drawings. The fifth example embodiment is an example in which a wearable terminal controls two camera units. FIG. 15A is a top schematic view illustrating an example in which the front camera unit and back camera unit of the wearable terminal are mounted. FIG. 15B is a front schematic view illustrating an example in which the front camera unit of the wearable terminal is mounted. FIG. 15C is a back schematic view illustrating an example in which the front camera unit and back camera unit of the wearable terminal are worn.

As illustrated in FIGS. 15A to C, the front camera unit 16 of the wearable terminal is mounted on the right shoulder of a wearer 2, and the back camera unit 17 is mounted on the upper portion of the back. The photographing direction of the camera of the front camera unit 16 is a direction in which the wearer 2 photographs from the front, and the photographing direction of the camera of the back camera unit 17 is a direction in which the wearer 2 photographs from the back. In other words, the photographing directions of the cameras of the front camera unit 16 and the back camera unit 17 are opposite in direction to each other. The elevation angles of the photographing direction of the camera of the front camera unit 16 and the photographing direction of the camera of the back camera unit 17 are respectively symmetric with respect to the horizontal plane.

Figure 16:
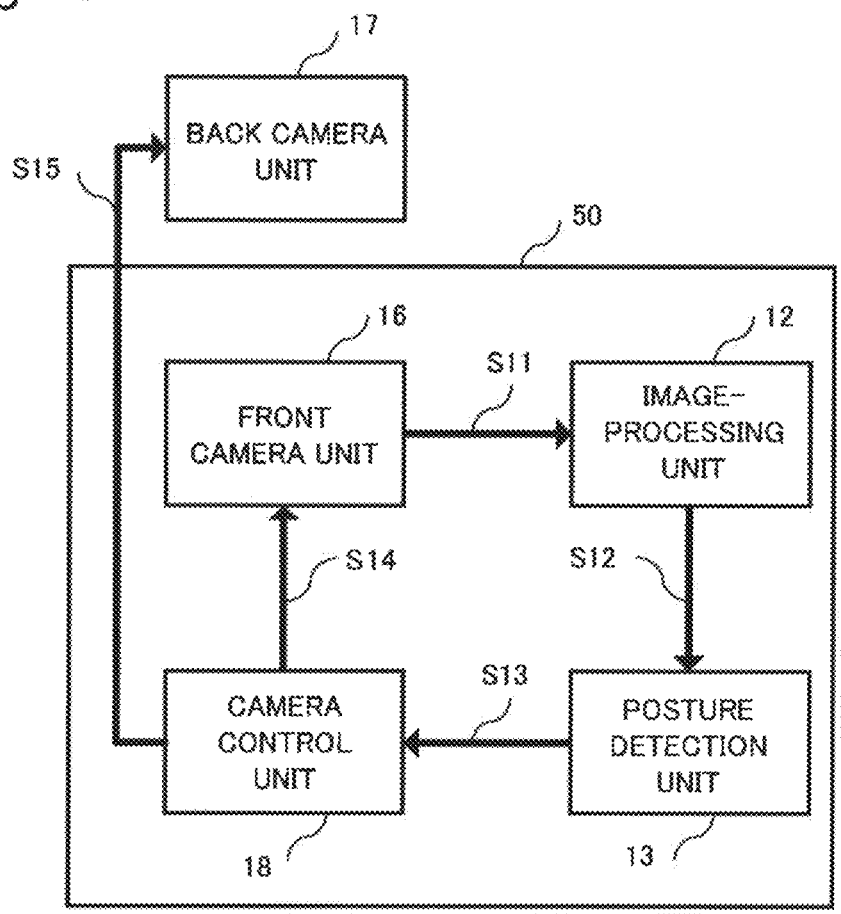
FIG. 16 is a block diagram illustrating the configuration of the wearable terminal according to the fifth example embodiment.

FIG. 16 is a block diagram illustrating the configuration of the wearable terminal according to the fifth example embodiment. With regard to the configuration of the wearable terminal 50 according to the fifth example embodiment in FIG. 16, the same configurations as those of the wearable terminal 10 according to the first example embodiment are denoted by the same reference characters, and the detailed descriptions thereof are omitted as appropriate.

The wearable terminal 50 according to the fifth example embodiment includes the front camera unit 16, an image-processing unit 12, a posture detection unit 13, a camera control unit 18, and the back camera unit 17. The back camera unit 17 includes a camera (not illustrated) and a shift unit (not illustrated) for changing the photographing direction of the camera.

The front camera unit 16 of the wearable terminal 50 of the fifth example embodiment acquires an image captured by photographing a predetermined subject by the camera (not illustrated). Then, the front camera unit 16 notifies the image-processing unit 12 of the captured image S11. The image-processing unit 12 of the wearable terminal 50 generates verification image information S12 based on the captured image S11 and notifies the posture detection unit 13 of the verification image information S12. The configuration and operation of the posture detection unit 13 are the same as those of the wearable terminal 10 according to the first example embodiment, and therefore, the detailed descriptions thereof are omitted. Like the wearable terminal 10 of the first example embodiment, the posture detection unit 13 sends generated posture difference information S13 to the camera control unit 18.

Based on the posture difference information S13, the camera control unit 18 of the wearable terminal 50 gives an instruction to the front camera unit 16 to control the photographing direction of the camera. Further, the camera control unit 18 instructs the back camera unit 17 to be set to be opposite in direction to the photographing direction of the front camera unit 16 to control the photographing direction of the camera. The back camera unit 17 may be controlled simultaneously with or after the control of the front camera unit 16.

In the fifth example embodiment described above, the example of application to the wearable terminal of the first example embodiment is described. However, application to the wearable terminals according to the second to fourth example embodiments is also acceptable.

In addition to the effects of the first example embodiment, the photographing direction of a camera in another camera unit can be easily adjusted according to the fifth example embodiment, as described above. The reason for this is because the adjustment of the photographing direction of the other camera is allowed to be reflective of a symmetry property between the photographing direction of the camera of the front camera unit 16 and the photographing direction of the camera of the back camera unit 17.

As above, the wearable terminal 50 according to the fifth example embodiment enables the photographing direction of the camera in the camera unit to be set to the predetermined direction, like the first example embodiment.

In addition, the wearable terminal according to the fifth example embodiment enables the photographing direction of the camera of the back camera unit 17 to be adjusted by giving an instruction that the photographing direction of the camera of the back camera unit 17 is set to be opposite in direction to the photographing direction of the front camera unit 16 to control the back camera unit 17.

(Hardware Configuration)

Figure 17:
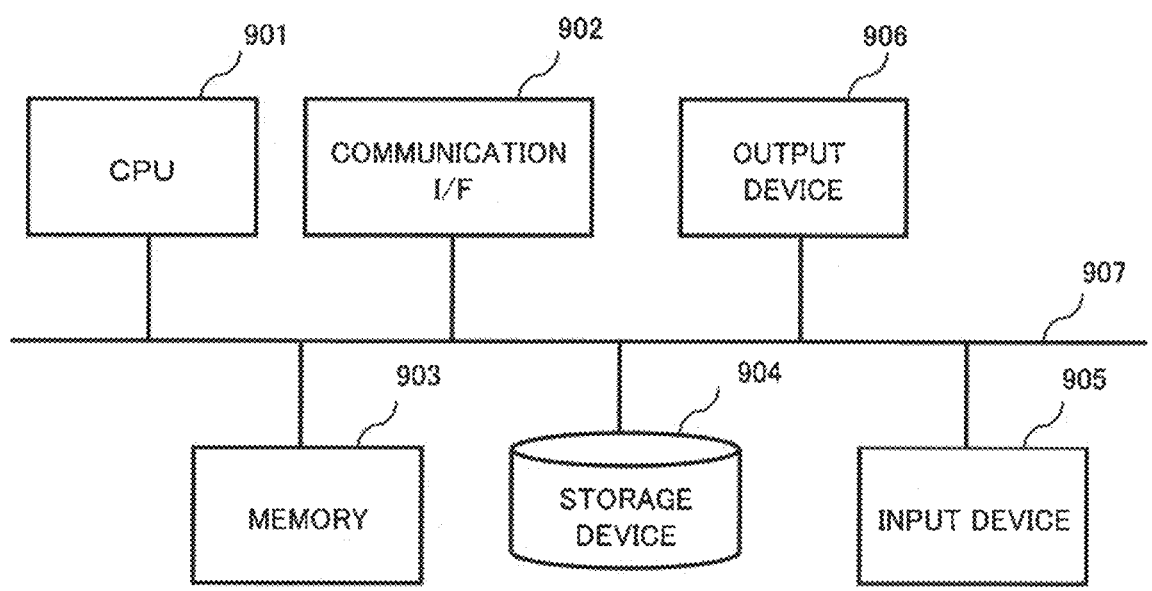
FIG. 17 is a block diagram illustrating a hardware configuration realized a processing unit or a control unit of the wearable terminal with a computer according to the first to fifth example embodiments.

FIG. 17 is a view illustrating a hardware configuration in which each control unit or each processing unit of the wearable terminals 10, 20, 30, 40, and 50 according to the first to fifth example embodiments is implemented by a computer device.

As illustrated in FIG. 17, each control unit or each processing unit of the wearable terminals 10, 20, 30, 40, and 50 includes a CPU (Central Processing Unit) 901 and a communication I/F (communication interface) 902 for network connection. Each control unit or each processing unit of the wearable terminals 10, 20, 30, 40, and 50 further includes a memory 903 and a storage device 904 such as a hard disk in which a program is stored. In addition, the CPU 901 is connected to an input device 905 and an output device 906 via a system bus 907.

The CPU 901 runs an operating system to control the wearable terminals according to the first to fifth example embodiments. In addition, the CPU 901 read, for example, programs and data from a recording medium mounted in a drive device to the memory 903.

In addition, the CPU 901 has, for example, the function of processing an information signal input from each function unit in each example embodiment and executes processing of various functions based on the programs.

The storage device 904 is, for example, an optical disk, a flexible disk, a magneto-optical disk, an external hard disk, a semiconductor memory, or the like. A storage medium in part of the storage device 904 is a non-volatile storage device, in which the programs are stored. The programs may also be downloaded from an external computer that is connected to a communication network and is not illustrated.

The input device 905 is implemented by, for example, a mouse, a keyboard, a touch panel, or the like, and is used for input manipulation.

The output device 906 is implemented by, for example, a display, and is used to output and confirm information or the like processed by the CPU 901.

As above, each example embodiment is implemented by the hardware configuration illustrated in FIG. 17. However, each implementation unit included in the wearable terminals 10, 20, 30, 40, and 50 is not particularly limited. In other words, the wearable terminals may be implemented by one device obtained by physical linking or may be implemented by plural devices which are two or more physically separated devices that are wired or wirelessly connected.

The disclosed subject matter is described above with reference to the example embodiments (and examples). However, the disclosed subject matter is not limited to the example embodiments (and examples) described above. Various modifications that can be understood by a person skilled in the art can be made to the constitutions and details of the disclosed subject matter within the scope of the disclosed subject matter.

This application claims priority based on Japanese Patent Application No. 2014-245098, which was filed on Dec. 3, 2014, and of which the entire disclosure is incorporated herein.

REFERENCE SIGNS LIST

2 Wearer
2' Mirror image
3A Setting image
3B Setting image
4 Mirror
5 Two-dimensional bar code
10 Wearable terminal
11 Camera unit
12 Image-processing unit
13 Posture detection unit
14 Camera control unit
15 Sensor unit
16 Front camera unit
17 Back camera unit
18 Camera control unit
20 Wearable terminal
22 Image-processing unit
23 Posture detection unit
30 Wearable terminal
32 Image-processing unit
40 Wearable terminal
50 Wearable terminal
121 Face detection unit
122 Face verification unit 123 Database
124 Face coordinate calculation unit
125 Feature extraction unit
126 Feature verification unit
127 Coordinate calculation unit
128 Information extraction unit
129 Coordinate calculation unit
131 Camera posture calculation unit
132 Camera posture database
901 CPU
902 Communication I/F (communication interface)
903 Memory
904 Storage device
905 Input device
906 Output device
907 System bus
S11 Captured image
S12 Verification image information
S13 Posture difference information
S14 Shift amount information
S22 Verification image information
S32 Image information

The invention claimed is:

1. A direction control device comprising:
at least one memory configured to store instructions and a reference image including a subject; and
at least one processor configured to execute the instructions to perform:
acquiring, by using a camera, an image captured by photographing the subject, the subject representing a bar code information;
calculating a first position of the subject in the captured image and a second position of the subject in the reference image;
extracting the bar code information from the subject in the captured image;
detecting a difference between the second position of the subject in the reference image and the first position of the subject in the captured image; and
shifting a photographing direction of the camera based on the detected difference and the bar code information extracted from the subject,
wherein the bar code information of the subject includes information indicating height at which the subject is installed and information indicating size of the subject.

2. The direction control device of claim 1, wherein the subject is a two-dimensional bar code.

3. The direction control device of claim 1, wherein the direction control device is a wearable terminal.

4. A method of controlling a direction control device, the method comprising:
acquiring, by using a camera, an image captured by photographing a subject, the subject representing a bar code information;
calculating a first position of the subject in the captured image and a second position of the subject in a reference image;
extracting the bar code information from the subject in the captured image;
detecting a difference between the second position of the subject in the reference image and the first position of the subject in the captured image; and
shifting a photographing direction of the camera based on the detected difference and the bar code information extracted from the subject,
wherein the bar code information of the subject includes information indicating height at which the subject is installed and information indicating size of the subject.

5. The method of claim 4, wherein the direction control device is a wearable terminal.

6. A non-transitory computer readable medium storing instructions which, when executed, cause a computer to control a direction control device to execute:
acquiring, by using a camera, an image captured by photographing a subject, the subject representing a bar code information;
calculating a first position of the subject in the captured image and a second position of the subject in a reference image;
extracting the bar code information from the subject in the captured image;
detecting a difference between the second position of the subject in the reference image and the first position of the subject in the captured image; and
shifting a photographing direction of the camera based on the detected difference and the bar code information extracted from the subject,
wherein the bar code information of the subject includes information indicating height at which the subject is installed and information indicating size of the subject.

7. The non-transitory computer readable medium of claim 6, wherein the direction control device is a wearable terminal.

* * * * *